United States Patent [19]

Mirabel

[11] 4,229,342
[45] Oct. 21, 1980

[54] PROCESS FOR EXTRACTING PROTEINS FROM MILK USING SILICA AND ANION EXCHANGE RESINS

[75] Inventor: Bernard Mirabel, Fresnes, France
[73] Assignee: Rhone-Poulenc Industries, Paris, France
[21] Appl. No.: 905,845
[22] Filed: May 15, 1978

[30] Foreign Application Priority Data

May 18, 1977 [FR] France ................ 77 15320

[51] Int. Cl.² ............................................. A23J 1/20
[52] U.S. Cl. .................................... 260/120; 127/44; 127/46 A; 260/112 R; 260/122; 426/271; 426/656
[58] Field of Search ................. 268/112 R, 120, 122

[56] References Cited

U.S. PATENT DOCUMENTS

| | | | |
|---|---|---|---|
| 2,045,097 | 6/1936 | Otting | 260/120 UX |
| 2,254,241 | 9/1941 | Pittman et al. | 260/120 UX |
| 3,234,199 | 2/1966 | Reid | 260/122 |
| 3,419,398 | 12/1968 | Murray | 426/583 |
| 3,573,271 | 3/1971 | Nielsen | 260/120 X |
| 4,018,752 | 4/1977 | Buhler et al. | 260/122 |
| 4,100,149 | 7/1978 | Meiller et al. | 260/112 R |

FOREIGN PATENT DOCUMENTS

845622 2/1977 Belgium .
2321932 3/1977 France .

OTHER PUBLICATIONS

Chem. Abstracts, vol. 70, 1969, Borisova et al., 103585u.
Chem. Abstracts, vol. 87, 1977, 103825y, Meiler et al., effective date of German Offen. Mar. 3, 1977.
Chem. Abstracts, vol. 82, 1975, 29737z, Fetisov et al.
Kirk et al., Encycl. of Chem. Tech., vol. 3, 19, p. 349.

*Primary Examiner*—Howard E. Schain
*Attorney, Agent, or Firm*—McDougall, Hersh & Scott

[57] ABSTRACT

Process for extracting proteins from milk which consists first of extracting the proteins, other than casein, by putting skimmed milk in contact with at least one anion exchanger resin and with silica, fixation of the proteins, then elution and finally separating the casein remaining in solution from the lactose and the mineral salts. This process is used in the dairy industries to prepare proteins usable in the food industry, the dietetic products industry, the pharmaceutical industry and the animal care products industry.

12 Claims, No Drawings

PROCESS FOR EXTRACTING PROTEINS FROM MILK USING SILICA AND ANION EXCHANGE RESINS

The invention pertains to a new process for extracting proteins from milk.

The processing of skimmed milk generally consists of first extracting the casein by acid or enzymatic coagulation, then extracting the proteins from the milkserum by means of thermal coagulation, ultrafiltration or ion exchange and finally separating the lactose, which can be hydrolyzed.

However, this process has its disadvantages. The separated casein is in a precipitated, partially deteriorated state and may contain other entrained proteins; the other proteins extracted by thermal coagulation lose some of their biological properties and the same is true with ultrafiltration, because the length of the operation generally necessitates pasteurization of the milkserum; as for their separation by ion exchange, it is very difficult to achieve this on an industrial scale because the known dextran or cellulose base ion exchangers have weak mechanical properties.

Ion exchangers for separating proteins from milkserum which do not have these disadvantages were described in French patent applications No. 75.26530 of Aug. 28, 1975 and No. 76.22985 of July 28, 1976, corresponding to U.S. application Ser. No. 714,308, filed Aug. 16, 1976, now U.S. Pat. No. 4,100,149, issued July 11, 1978. However, the casein is still in its precipitated, partially deteriorated state and may contain proteins carried along with it.

With the process of this invention for fractionating milk, these disadvantages are avoided making it possible to obtain industrially pure proteins in their native state, with all their biological properties.

The process consists of extracting all the proteins from the skimmed milk, leaving a solution of mineral salts and lactose. It is characterized in that the proteins other than the casein are first extracted by putting the skimmed milk in contact first with at least one anion exchanger resin and then with silica, or first with silica and then with at least one anion exchanger resin, fixation of the proteins and elution; the casein remaining in solution is then separated from the mineral salts and the lactose.

As used herein, the term proteins other than casein, or proteins in the milkserum, has reference to lactalbumins, serum albumin, lactoglobulins and immunoglobulins.

The anion exchanger resins are composed of supports: aluminas or silicas, coated with less than 20 mg/m2 of a cross-linked polymer film containing or carrying tertiary amine or quarternary ammonium salts functional groups with the general formulae

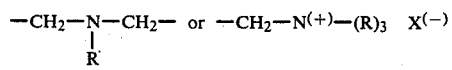

where R, alike or different, represents an alkyl or hydroxyalkyl radical having 1 to 4 carbon atoms and X an organic or inorganic anion such as, for example, chloride, sulfate, nitrate, phosphate, citrate. Their exchange capacity is less than 2 meq./g.

The silica and the anion exchanger resin supports have the following characteristics: granulometry between 4 μm and 5 mm, specific surface area of approximately 5 to 150 m2/g, a porous volume of 0.4 to 2 ml/g and a pore diameter which is less than the size of the casein but more than the size of the other proteins and is comprised between 250 and 2500 Å.

The cross-linked polymers, which coat the surface of the supports, are well known products, obtained from monomers, such as the epoxy compounds, which cross-link with polyamines as catalysts; formaldehyde which cross-links by polycondensation with urea, melamine, polyamines or phenols; vinyl monomers: vinylpyridine, styrene and derivatives, which cross-link with polyfunctional monomers such as the diacrylates or dimethacrylates of mono- or poly- alkylene glycols, divinylbenzene, vinyltrialkoxysilane, vinyltrihalogenosilane, bismethylene acrylamide, in the presence of an initiator or ultraviolet rays.

The inorganic support is coated with the cross-linked polymer by means of impregnation of the support with a solution of the monomer or monomers and, if need be, with the initiator in a solvent, which is then evaporated and the monomers cross-linked according to known processes. As solvent, any product capable of dissolving the monomers and the initiator is used, its boiling point preferably being the lowest possible to promote subsequent evaporation. These are, for example, methylene chloride, ethyl ether, benzene, acetone, ethyl acetate.

If the cross-linked polymer coating the surface of the support does not have functional groups in its chain, it must be modified. This occurs most notably with styrene and derivatives base cross-linked polymers and polymers of formaldehyde with urea, melamine, polyamines, phenols.

For polymers of styrene or phenol-formaldehyde, this modification consists of fixing chloromethyl groups on the polymer, which are then made to react with a secondary or tertiary amine, a reaction which is carried out according to any known technique.

To fix chloromethyl groups on the polymer, it is preferable, in the case of styrene polymers, to disperse the polymer coated inorganic support in chloromethyl ether, at a high temperature, in the presence of a Lewis acid. On the other hand, for a phenol-formaldehyde resin, the polymer coated inorganic support can be dispersed, for example, in epichlorhydrin, with the reaction occurring at a high temperature.

For polymers of formaldehyde with polyamines, urea, melamine, this modification consists of changing the primary amines in the chain into tertiary amines or quarternary ammonium salts according to any classical technique, for example, reaction with a sulfate or an alkyl halide.

The skimmed milk is put into contact with the anion exchanger resin or resins and the silica without modifying the milk pH, at temperatures between 0° and 50° C., and preferably between 0° and 15° C.

The quantity of anion exchanger resin or resins is approximately 5 to 15 grams per gram of all the proteins to be extracted, and the quantity of silica is approximately 2 to 7 grams per gram of all the proteins to be extracted.

The proteins retained by the anion exchanger resin or resins are the β-lactoglobulins, the α-lactalbumins, the serum albumin and a small quantity of the immunoglobulins. The silica fixes most of the immunoglobulins.

The separation of proteins from the resin or resins and from the silica is obtained by means of elution with either a high ion strength solution or a solution of acid pH for anion exchanger resins and basic pH for silica. The solution of acid pH is an organic or inorganic acid solution such as, for example, hydrochloric acid, acetic acid, nitric acid, sulfuric acid and lactic acid. The solution of basic pH is a solution of alkaline hydroxides such as sodium hydroxide, potassium hydroxide or ammonium hydroxide.

For a more selective separation, it is possible to treat the milk successively with several anion exchanger resins, alike or different, before or after treating with silica. Thus, in the case of two anion exchange resins, the elution solution for the first resin is very rich in β-lactoglobulins, while the elution solution for the second resin contains the α-lactalbumins, serum albumin and very small quantities of β-lactoglobulins and immunoglobulins.

The same results can be obtained whether the proteins are extracted from skimmed milk either discontinuously, semicontinuously in columns or continuously with a series of columns. Continuous operations are particularly suited for industrial usage because the resins allow for easier filling of the columns, a high output and they facilitate elution.

The protein solutions obtained contain only traces of lactose and mineral salts. They can be used as they are, or the proteins can be separated by any known technique and more particularly by atomization.

After extraction by the anion exchange resin or resins and the silica, the remaining solution which is composed of casein, lactose and mineral salts no longer contains other proteins. The casein can be extracted by exclusion chromatography or more particularly by ultrafiltration, according to any known technique suited to this specific case. Extraction may be achieved either discontinuously or continuously.

In this way, a solution of native casein in water is obtained, the concentration of which varies according to the extraction process used. A solution of lactose and mineral salts is also obtained.

The solution of noncoagulated, native casein no longer contains anything but traces of lactose and it can be used as is, or else the casein may be separated from the solution, notably by atomization.

In a variant of the process of the invention, the lactose and the mineral salts are separated from the skimmed milk; the proteins other than the casein are then extracted by putting the milk into contact first with at least one anion exchanger resin and then with silica, or first with silica and then at least one anion exchanger resin, fixation of the proteins followed by elution; the casein remaining in solution.

The lactose and mineral salts are separated from the skimmed milk by extraction by means of exclusion chromatography or ultrafiltration.

The extraction of proteins by the anion exchanger resin or resins and the silica is carried out as stated above.

After extraction of proteins other than casein, a solution of native, noncoagulated casein is obtained.

In another variant, the process in the invention can be applied to milkserum; i.e., to skimmed milk from which the casein has been eliminated. In this case, the milkserum is put into contact first with at least one anion exchanger resin and then with silica, or first with silica and then at least one anion exchanger resin, fixation of the proteins and elution.

In the copending application Ser. No. 714,308, description is made of the separation of proteins from milkserum by using anion exchanger resins and cation exchanger resins. However, silica used instead of a cation exchanger resin makes elution much easier, yielding protein solutions which are more concentrated. Consequently, when the proteins are dried, there is less water to be eliminated, hence a shorter processing time, less harmful to the proteins.

Furthermore, silica is a simpler product than cation exchanger resins and it has been authorized for use in the food industry.

The process for extracting proteins from milkserum by anion exchanger resin or resins and silica is the same as the process described for milk, with the difference that contact of the lactoserum with the anion exchanger resin or resins and the silica is carried out at a pH higher than 4 and preferably between 5.5 and 7.5, at temperatures between 0° and 50° C. and preferably between 0° and 30° C.

Once the proteins have been extracted by anion exchanger resin or resins and silica, the remaining solution contains lactose and mineral salts, but no more proteins.

Whatever its origin, the lactose in solution can be hydrolyzed chemically or enzymatically according to any known process, to obtain a solution of glucose and galactose.

The process of the invention is used in the dairy industries to prepare proteins, including casein, which are particularly suitable to be used in the food industry, the dietetic products industry, the pharmaceutical industry and the animal care products industry.

These examples for carrying out the invention are given by way of illustration and not by way of limitation.

EXAMPLE 1:

20 g of an anion exchanger resin, composed of a silica with a granulometry of 100 to 200 μm, a specific surface area of 24 m2/g, an average pore diameter of 1400 Å and a porous volume of 1 ml/g, coated with 3.3 mg/m2 of a styrene-vinyltriethoxysilane copolymer carrying the functional groups

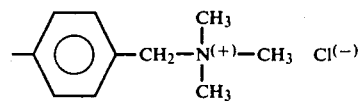

are placed in column 1 which is 2.5 cm in diameter.

This resin has the following characteristics:

| | |
|---|---|
| proportion of carbon | 4.8% |
| proportion of chlorine | 2 % |
| proportion of nitrogen | 0.9% |
| exchange capacity | 0.6 meq./g |

10 g of silica balls with a granulometry of 100 to 200 μm, a specific surface area of 25 m2/g, a pore diameter of 1400 Å and a porous volume of 1.1 ml/g are placed in column 2 which is 2.5 cm in diameter.

After the two columns are arranged in series, the resin and the silica are washed by running through 500 ml of water.

250 ml of skimmed milk, containing 7 g of casein, 1.6 g of other proteins and 12 g of lactose, are percolated first in column 1, then in column 2, at the rate of 100 ml/h.

The resin and the silica in the two columns are washed by running through 200 ml of water.

When an N/100 solution of hydrochloric acid is run through column 1, the fixed proteins are eluted. 33 ml of solution, containing 1.3 g of proteins are obtained. These proteins are the α-lactalbumins, the β-lactoglobulins, serum albumin and a small amount of immunoglobulins.

When a N solution of ammonium carbonate is run through column 2, the fixed proteins are eluted: 12 ml of solution containing 0.3 g of immunoglobulins are obtained.

The two protein solutions contain less than 1% by weight of fatty substances and lactose. The electrophoretic migration of proteins is identical to the one they had in the milk. Therefore, they are not denatured.

The solutions leaving column 2 (milk+wash waters), containing only casein and no other proteins, undergo ultrafiltration.

The retained product contains approximately 7 g of native casein at a concentration of 20% by weight.

The ultrafiltrate contains almost all the lactose at a concentration of about 42 g/l and the mineral salts.

EXAMPLE 2

Example 1 is repeated, but the processing of skimmed milk by the anion exchanger resin and silica is carried out at 50° C.

The results are identical to those in Example 1.

EXAMPLE 3

Example 1 is repeated, by placing column A, which is 1 cm in diameter, containing 3 g of the same anion exchanger resin as that in column 1, before column 1. By elution in column A with an N/100 solution of HCl, 15 ml of a solution containing 0.3 g of proteins made up almost exclusively of β-lactoglobulins is obtained.

Elution in column 1 with an N/100 solution of HCl yields 33 ml of a solution containing 1 g of proteins consisting of mostly α-lactalbumins, serum albumin and a small quantity of β-lactoglobulins and immunoglobulins.

Elution in column 2 yields the same results as in example 1.

EXAMPLE 4

10 g of silica balls with a granulometry of 100 to 200 μm, a specific surface area of 25 m2/g, a pore diameter of 1400 Å and a porous volume of 1.1 ml/g, are placed in column 1 which is 2.5 cm in diameter.

15 g of an anion exchanger resin composed of a silica with a granulometry of 100 to 200 μm, a specific surface area of 24 m2/g, an average pore diameter of 1400 Å and a porous volume of 1 ml/g, coated with 6 mg/m2 of a styrene-vinyltriethoxysilane copolymer carrying the functional groups

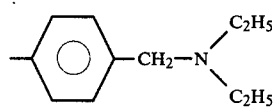

and having the following characteristics:

| proportion of carbon | 7.5% |
|---|---|
| proportion of nitrogen | 1.5% |
| exchange capacity | 1.07 meq./g | are placed in column 2, which is 2.5 cm in diameter.

After the two columns are placed in series, the silica and the resin are washed by running through 500 ml of water.

250 ml of skimmed milk, containing 7 g of casein, 1.6 g of other proteins and 12 g of lactose are percolated at the rate of 100 ml/h first in column 1, then in column 2.

The silica and the resin in the two columns are then washed by running through 200 ml of water.

When a N/100 solution of ammonium hydroxide is run through column 1, the fixed proteins are eluted. 12 ml of solution containing 0.4 g, i.e. the majority of immunoglobulins, are obtained.

When a N/10 solution of hydrochloric acid is run through column 2, the fixed proteins are eluted: α-lactalbumins, β-lactoglobulins, serum albumin and traces of immunoglobulins; 23 ml of solution contain 1.2 g of these proteins.

The two protein solutions contain less than 1% by weight of lactose. The electrophoretic migration of proteins is the same as the one they had in the milk. Therefore, they are not denatured.

The solution leaving column 2, approximately 260 ml, no longer containing proteins except for casein, is percolated in column 3 in order to separate the casein by exclusion chromatography. This column, which is 3 cm in diameter, contains 450 g of silica with a granulometry of 100–200 μm, a specific surface area of 400 m2/g, an average pore diameter of 80 Å and a porous volume of 1 ml/g and is eluted with water.

330 ml of a solution containing almost all the native casein and a solution containing the lactose and the mineral salts are obtained.

EXAMPLE 5

15 g of the same anion exchanger resin as that in column 2, Example 4, are placed in column 1, which is 2.5 cm in diameter.

10 g of silica balls with a granulometry of 100 to 200 μm, a specific surface area of 50 m2/g, a pore diameter of 800 Å and a porous volume of 1.1 ml/g, are placed in column 2, which is 2.5 cm in diameter.

After the two columns are placed in series, the resin and the silica are washed by running through 500 ml of water.

300 ml of milkserum with a pH of 6.5, containing 1.5 g of proteins and 11 g of lactose, are percolated at ambient temperature, first in column 1, then in column 2, at the rate of 400 ml/h.

The resin and the silica in the two columns are washed by running through 200 ml of water.

When a N/100 solution of hydrochloric acid is run through column 1, the fixed proteins are eluted. 33 ml of solution containing 1.25 g of proteins are obtained. These proteins are the α-lactalbumins, serum albumin, the β-lactoglobulins and a small quantity of immunoglobulins.

When a N/100 solution of ammonium hydroxide is run through column 2, the fixed proteins are eluted: 10 ml of solution containing 0.25 g of proteins composed almost exclusively of immunoglobulins are obtained.

The two protein solutions contain less than 1% by weight in fatty substances and lactose. The electrophoretic migration of proteins is the same as the one they had in the milkserum. Therefore, they are not denatured.

EXAMPLE 6

Example 5 is repeated, but processing the milkserum with the anion exchanger resin and the silica is carried out at 50° C.

The results are the same as those in Example 5.

EXAMPLE 7

Example 5 is repeated, by placing column A, which is 1 cm in diameter, containing 3 g of the same anion exchanger resin as that in column 1, before column 1. By elution in column A with a N/100 solution of HCl, 15 ml of a solution containing 0.3 g of proteins composed almost exclusively of β-lactoglobulins are obtained.

Elution in column 1 with a N/100 solution of HCl yields 33 ml of a solution containing 0.95 g of proteins composed mostly of α-lactalbumins and serum albumin and a very small quantity of β-lactoglobulins and immunoglobulins.

Elution in column 2 yields the same results as in Example 5.

EXAMPLE 8

10 g of silica balls with a granulometry of 100 to 200 μm, a specific surface area of 25 m2/g, a pore diameter of 1400 Å and a porous volume of 1.1 ml/g, are placed in column 1, which is 2.5 cm in diameter.

20 g of the same anion exchanger resin as that found in column 1, example 1, are placed in column 2 which is 2.5 cm in diameter.

After the two columns are placed in series, the silica and the resin are washed by running through 500 ml of water.

300 ml of milkserum of pH 6.5, containing 1.5 g of proteins and 11 g of lactose, are percolated at ambient temperature, at the rate of 600 ml/h first in column 1, then in column 2.

The silica and the resin in the two columns are then washed by running through 200 ml of water.

When a N/100 solution of ammonium hydroxide is run through column 1, the fixed proteins are eluted. 12 ml of solution containing 0.4 g, i.e., the majority of immunoglobulins, are obtained.

When a N/10 solution of sulfuric acid is run through column 2, the fixed proteins are eluted: α-lactalbumins, β-lactoglobulins, serum albumin and traces of immunoglobulins; 20 ml of solution contain 1.1 g of these proteins.

The two protein solutions contain at least 1% by weight of lactose. The electrophoretic migration of proteins is the same as the one they had in the milkserum. Therefore, they are not denatured.

EXAMPLE 9

20 g of the same anion exchanger resin as the one in column 2, example 1, are placed in column 1, which is 2.5 cm in diameter.

10 g of silica balls with a granulometry of 100 to 200 μm, a specific surface area of 25 m2/g, a pore diameter of 1400 Å and a porous volume of 1.1 ml ml/g are placed in column 2, which is 2.5 cm in diameter.

After the two columns are placed in series, the resin and the silica are washed by running through 500 ml of water.

500 ml of milkserum, which is adjusted to a pH 7.5 by adding 0.1 N sodium hydroxide, are filtered to eliminate the insoluble substances and contain 2.5 g of proteins and 18 g of lactose. This is percolated at ambient temperature first in column 1, then in column 2, at a rate of 300 ml/h.

The resin and the silica in the two column are washed by running through 100 ml of water.

When a N/100 solution of hydrochloric acid is run through column 1, the fixed proteins are eluted. 35 ml of solution containing 2.05 g of proteins are obtained. These proteins are the α-lactalbumins, the β-lactoglobulins, serum albumin and a small quantity of immunoglobulins.

When a molar ammonium carbonate solution is run through column 2, the fixed proteins are eluted: 12 ml of solution containing 0.45 g of proteins composed almost exclusively of immunoglobulins are obtained.

For comparative purposes, this example is repeated, but instead of 10 g of silica in column 2, 10 g of a cation exchanger resin are used, the resin is composed of a silica with a granulometry of 100 to 200 μm, a specific surface area of 25 m2/g, an average pore diameter of 1400 Å and a porous volume of 1.1 ml/g, coated with 7.2 mg/m2 of a copolymer of acrylic acid and dimethacrylate of diethylene glycol carrying the functional groups —COOH.

This resin has the following characteristics:

| proportion of carbon | 10.55% |
|---|---|
| exchange capacity | 1.05 meq./g |

By elution in the first column, the same results are obtained as in Example 5.

By elution in column 2, 17 ml of solution containing 0.45 g of proteins composed almost exclusively of immunoglobulins are obtained.

It is noted that when using silica, a much simpler resin than the cation exchanger resin, it is possible to obtain a more concentrated solution of immunoglobins, 2.65 g/100 ml with the exchanger resin 3.75 g/100 ml, which is 41.5% more proteins, with the silica.

I claim:

1. Process for extracting proteins and casein from milk, characterized in that the proteins other than the casein are first extracted by putting skimmed milk into contact first with at least one anion exchanger resin and then in a subsequent and separate step with silica in the absence of an ion exchange resin, or by putting skimmed milk into contact first with silica in the absence of an ion exchange resin then in a subsequent and separate step with at least one anion exchanger resin whereby proteins become fixed on the anion exchange resin and the silica, leaving a solution containing casein mineral salts and lactose and eluting the protein and separating the casein remining in solution from the mineral salts and lactose.

2. Process as claimed in claim 1, in which the anion exchanger resins are formed of a support coated with less than 20 mg/m2 of a cross-linked polymer film containing or carrying tertiary amine or quarternary ammonium salts functional groups with the general formulae

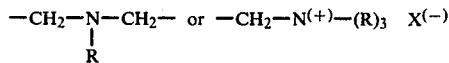

in which R, alike or different, represents an alkyl or hydroxyalkyl radical having 1 to 4 carbon atoms and X an organic or inorganic anion and have an exchange capacity less than 2 meq./g.

3. Process as claimed in claim 2, in which the support is selected from the group consisting of an alumina and silica.

4. Process as claimed in claim 1, in which the anion exchanger resin supports and the silica have a granulometry between 4 μm and 5 mm, a specific surface area of approximately 5 to 150 m2/g, a porous volume of 0.4 to 2 ml/g and a pore diameter between 250 and 2500 Å.

5. Process as claimed in claim 2, in which the cross-linked polymer is selected from the group consisting of epoxy compounds cross-linked with polyamines as catalyst; formaldehyde cross-linked by polycondensation with urea, melamine, polyamines and phenols; vinyl monomers: vinylpyridine, styrene and derivatives, cross-linked with polyfunctional monomers: diacrylates or dimethacrylates of mono- or polyalkylene glycols, divinylbenzene, vinyltrialkoxysilane, vinyltrihalogenosilane, bis-methylene acrylamide.

6. Process as claimed in claim 1, in which contact of the skimmed milk with the anion exchanger resins and the silica is carried out at a temperature between 0° and 50° C.

7. Process as claimed in claim 1, in which the quantity of anion exchanger resin or resins is 5 to 15 grams per gram of proteins to be extracted and the quantity of silica is 2 to 7 grams per gram of proteins to be extracted.

8. Process as claimed in claim 1, in which the proteins retained by the resins and silica are eluted with either a high ion strength solution or a solution of acid pH for the anion exchanger resins and basic pH for the silica.

9. Process as claimed in claim 1, in which the protein extraction is carried out discontinuously, semicontinuously or continuously.

10. Process as claimed in claim 1, in which after the proteins have been extracted, the native casein is extracted by exclusion chromatography or ultrafiltration.

11. The process for extracting proteins from milk comprising separating the lactose and mineral salts from skimmed milk by ultrafiltration or exclusion chromatography; extracting the proteins other than casein by putting the milk into contact first with at least one anion exchanger resin and then in a subsequent and separate step with silica in the absence of an ion exchange resin, or by putting the milk into contact first with silica in the absence of an ion exchange resin and then in a subsequent and separate step with at least one anion exchanger resin whereby proteins become fixed to the anion exchange resin and to the silica, and eluting the fixed protein from the anion exchange resin and the silica, leaving the native casein in solution.

12. The process for extracting proteins from milkserum, in which the milkserum is put into contact with first at least one anion exchanger resin and then in a subsequent and separate step with silica in the absence of an ion exchange resin, or by putting the milkserum into contact first with silica in the absence of an ion exchange resin and then in a subsequent and separate step with at least one anion exchanger resin, at a pH higher than 4, whereby proteins become fixed to the anion exchange resin and to the silica and eluting the fixed proteins from the anion exchange resin and from the silica.

* * * * *